US009520709B2

(12) United States Patent
Ruess

(10) Patent No.: US 9,520,709 B2
(45) Date of Patent: Dec. 13, 2016

(54) SURGE PROTECTION DEVICE HAVING TWO PART CERAMIC CASE FOR METAL OXIDE VARISTOR WITH ISOLATED THERMAL CUT OFF

(71) Applicant: SCHNEIDER ELECTRIC USA, INC., Palatine, IL (US)

(72) Inventor: John R. Ruess, Farmington, UT (US)

(73) Assignee: Schneider Electric USA, Inc., Andover, MA (US)

( * ) Notice: Subject to any disclaimer, the term of this patent is extended or adjusted under 35 U.S.C. 154(b) by 231 days.

(21) Appl. No.: 14/514,831

(22) Filed: Oct. 15, 2014

(65) Prior Publication Data

US 2016/0111871 A1    Apr. 21, 2016

(51) Int. Cl.
H02H 5/04        (2006.01)
H01C 7/12        (2006.01)

(52) U.S. Cl.
CPC .................. H02H 5/04 (2013.01); H01C 7/12 (2013.01); H01C 7/126 (2013.01)

(58) Field of Classification Search
CPC ....................................................... H02H 5/04
USPC ......................................................... 361/118
See application file for complete search history.

(56) References Cited

U.S. PATENT DOCUMENTS 3,685,026 A    8/1972  Wakabayashi et al.
3,685,028 A    8/1972  Wakabayashi et al.
4,352,140 A *  9/1982  Axelsson ................. H01C 7/12
                                                          361/117
4,652,964 A    3/1987  Ziegenbein
4,720,759 A    1/1988  Tabei
4,726,991 A    2/1988  Hyatt et al.
4,887,183 A    12/1989 Biederstedt et al.
4,977,357 A    12/1990 Shrier
5,068,634 A    11/1991 Shrier (Continued)

FOREIGN PATENT DOCUMENTS

CN    1253656       5/2000
CN    101320606     12/2008

OTHER PUBLICATIONS

European Transactions on Electrical Power; Euro. Trans. Electr. Power 2004; 14:175-184 (DOI: 10.1002/etep.15) Influence of moisture and partial discharges on the degradation of high-voltage surge arresters Krystian Leonard Chrzan.

Primary Examiner — Thienvu Tran
Assistant Examiner — Kevin J Comber
(74) Attorney, Agent, or Firm — Locke Lord LLP

(57) ABSTRACT

A surge protection device comprises a gas-tight container formed by a ceramic housing and ceramic lid surrounding an uncoated MOV device, to contain explosive gases and scattered solids produced during a thermal runaway. There is no coating on the MOV device, such as an organic polymer coating. Instead, the ceramic housing has two gas-tight chambers separated by a ceramic partition. The MOV device is located in a first gas-tight chamber and has an electrode that passes into the second gas-tight chamber and terminates in a fixed contact. A thermal cutoff device of simple construction, is located in the second gas-tight chamber, having a spring connector terminating in a moveable contact that is bonded to the electrode by a low melting point solder. The ceramic partition shields the thermal cutoff device from being fouled by debris scattered from destruction of the MOV device's metal oxide core during a thermal runaway.

8 Claims, 4 Drawing Sheets

(56) References Cited

U.S. PATENT DOCUMENTS

| | | |
|---|---|---|
| 5,260,848 A | 11/1993 | Childers |
| 5,294,374 A | 3/1994 | Martinez et al. |
| 5,393,596 A | 2/1995 | Tornero et al. |
| 5,574,614 A | 11/1996 | Busse et al. |
| 5,807,509 A | 9/1998 | Shrier et al. |
| 5,808,850 A | 9/1998 | Carpenter, Jr. |
| 6,040,971 A | 3/2000 | Martenson et al. |
| 6,211,770 B1 | 4/2001 | Coyle |
| 6,396,676 B1 | 5/2002 | Doone et al. |
| 6,430,019 B1 | 8/2002 | Martenson et al. |
| 6,433,987 B1 | 8/2002 | Liptak |
| 7,271,991 B2 | 9/2007 | Hoopes |
| 7,477,503 B2 | 1/2009 | Aszmus |
| 7,741,946 B2 | 6/2010 | Ho |
| 7,808,364 B2 | 10/2010 | Chou et al. |
| 7,839,257 B2 | 11/2010 | Cernicka |
| 7,920,044 B2 | 4/2011 | Scheiber et al. |
| 8,174,351 B2 | 5/2012 | Scheiber et al. |
| 8,217,750 B2 | 7/2012 | Machida |
| 8,274,357 B2 | 9/2012 | Chang |
| 8,289,122 B2 | 10/2012 | Mattiesen et al. |
| 8,461,956 B2 | 6/2013 | Tseng et al. |
| 8,659,866 B2 | 2/2014 | Douglass et al. |
| 2007/0041141 A1 | 2/2007 | Deng |
| 2007/0182522 A1 | 8/2007 | Chang |
| 2009/0323244 A1* | 12/2009 | Hoopes .................. H02H 9/042 361/103 |

* cited by examiner

SURGE PROTECTION DEVICE HAVING TWO PART CERAMIC CASE FOR METAL OXIDE VARISTOR WITH ISOLATED THERMAL CUT OFF

BACKGROUND OF THE INVENTION

1. Field of the Invention

The invention disclosed relates to surge protection devices.

2. Discussion of the Related Art

Transient voltage surges above normal voltage levels may occur in power lines due to power transmission system problems, regional substation distribution problems, lightning strikes, and the like. Transient voltage surges may also occur in telephone networks and TV cable systems due to lightning strikes. Electrical and electronic equipment connected to power lines, telephone lines, and TV cable lines may sustain significant damage from high currents resulting from transient voltage surges.

A variety of surge protector devices have been developed to protect electrical and electronic equipment from the effects of transient voltage surges by either blocking or by shorting to ground high currents resulting from unwanted voltages above a safe threshold. Metal oxide varistor (MOV) devices have been used as surge protection devices, such as by connecting the device as a shunt between the hot wire or neutral wire of equipment to be protected and the ground wire. A MOV device comprises a layer of zinc oxide grains that is sandwiched between two conductive plates. The layer is electrically equivalent to back-to-back diode pairs. When a low voltage is applied across the plates, only a small current flows, however when a large transient voltage is applied, the diode junction breaks down and a large current flows. The result is that high currents resulting from transient voltage surges on power lines, phone lines, or TV cables, may be shunted to ground by the MOV device, thereby protecting the connected electrical and electronic equipment.

A problem with conventional MOV devices is that they typically are coated with an organic polymer, such as epoxy. There is an upper limit to the current that may be shunted by a MOV device before the device material overheats and destroys the device. Epoxy and other organic polymers in the coating are subject to thermal decomposition at the elevated temperatures of an overheated MOV device. The chemical decomposition of the organic polymers in the coating generates hot gases that may explosively scatter melted and charred solids and debris onto adjacent electrical components.

Some surge protection devices have addressed the problem of overheating in the MOV device they contain, by connecting the MOV device in series with a thermal cutoff device. In one known example, the surge protection device is contained in a plastic housing, and the thermal cutoff device includes a conductive arm that is spring loaded to rotate away from the MOV device. A low melting point solder is used to temporarily bond a contact at the end of the rotary arm to the MOV device. If the temperature of the MOV device rises due to a current surge, the solder melts and the arm is propelled by the spring to rotate away from the MOV device, interrupting the current surge. The components of this thermal cutoff device are relatively complex. The surge protector has the problem of its plastic housing being unable to contain explosive gases and combustion products that may be produced by the MOV device, if it is exposed to a very large transient voltage surge. Additionally, the combustion products thus produced by the MOV device tend to foul the thermal cutoff device, preventing it from interrupting the surge current.

SUMMARY OF THE INVENTION

These problems are addressed and solved by the subject invention. The surge protection device has a box-shaped ceramic housing with an open side that is covered by a ceramic lid. The ceramic housing and ceramic lid form a gas-tight container that prevents the escape of explosive gases and scattered solids that may be produced by an uncoated metal oxide varistor (MOV) contained in the housing. The ceramic housing has two gas-tight chambers separated by a ceramic partition, which are covered by the ceramic lid that fastens onto the housing. The MOV device is located in a first one of the gas-tight chambers, with a first conductive plate connected to a first device lead passing through a wall of the housing. The MOV device has a second plate connected to an electrode passing into the second gas-tight chamber, which terminates in a fixed contact. Notably, there is no coating on the MOV device, such as an organic polymer coating. Instead, the surge protection device relies upon the gas-tight container formed by the ceramic housing and ceramic lid, to prevent the escape of explosive gases and scattered solids that may be produced by the uncoated MOV contained in the housing.

A thermal cutoff device of simple construction, is located in the second gas-tight chamber and is shielded by the ceramic partition from combustion products or debris that may be scattered by the MOV device. The thermal cutoff device is connected to a second device lead passing through a wall of the housing. The thermal cutoff device comprises a spring connector terminated with a moveable contact. The spring connector has a spring bias that biases the moveable contact away from the fixed contact. When the spring connector is urged toward the fixed contact, the moveable contact becomes superimposed over the fixed contact of the electrode. A low melting-temperature solder bond is located between the fixed and moveable contacts, to temporarily bond the moveable contact to the fixed contact. The solder-bonded contacts form a series connection of the metal oxide varistor to the thermal cutoff device. The solder bond is configured to melt and release the moveable contact from being bonded to the fixed contact when the temperature of the contacts rises above a melting point of the solder bond due to a current surge through the varistor. As a result, the bias of the spring connector separates the contacts and interrupts the connection of the thermal cutoff device to the metal oxide varistor, and thus interrupts the series path between the first and second device leads.

The components of the surge protection device are simple, inexpensive, and easy to assemble. If the energy in a transient pulse is too high, localized heating in the uncoated MOV device during a thermal runaway, may melt, burn, vaporize, or otherwise damage or destroy the metal oxide core of the MOV device. However, the gas-tight container formed by the ceramic housing and ceramic lid surrounding the uncoated MOV device, is able to contain the explosive gases and scattered solids. The ceramic partition separating the uncoated MOV device in the first chamber from the thermal cut-off device in the second chamber, shields the thermal cutoff device from being fouled by debris scattered from destruction of the MOV device's metal oxide core during a thermal runaway.

BRIEF DESCRIPTION OF THE FIGURES

Example embodiments of the invention are depicted in the accompanying drawings that are briefly described as follows.

DETAILED DESCRIPTION OF EMBODIMENTS OF THE INVENTION

Figure 1:
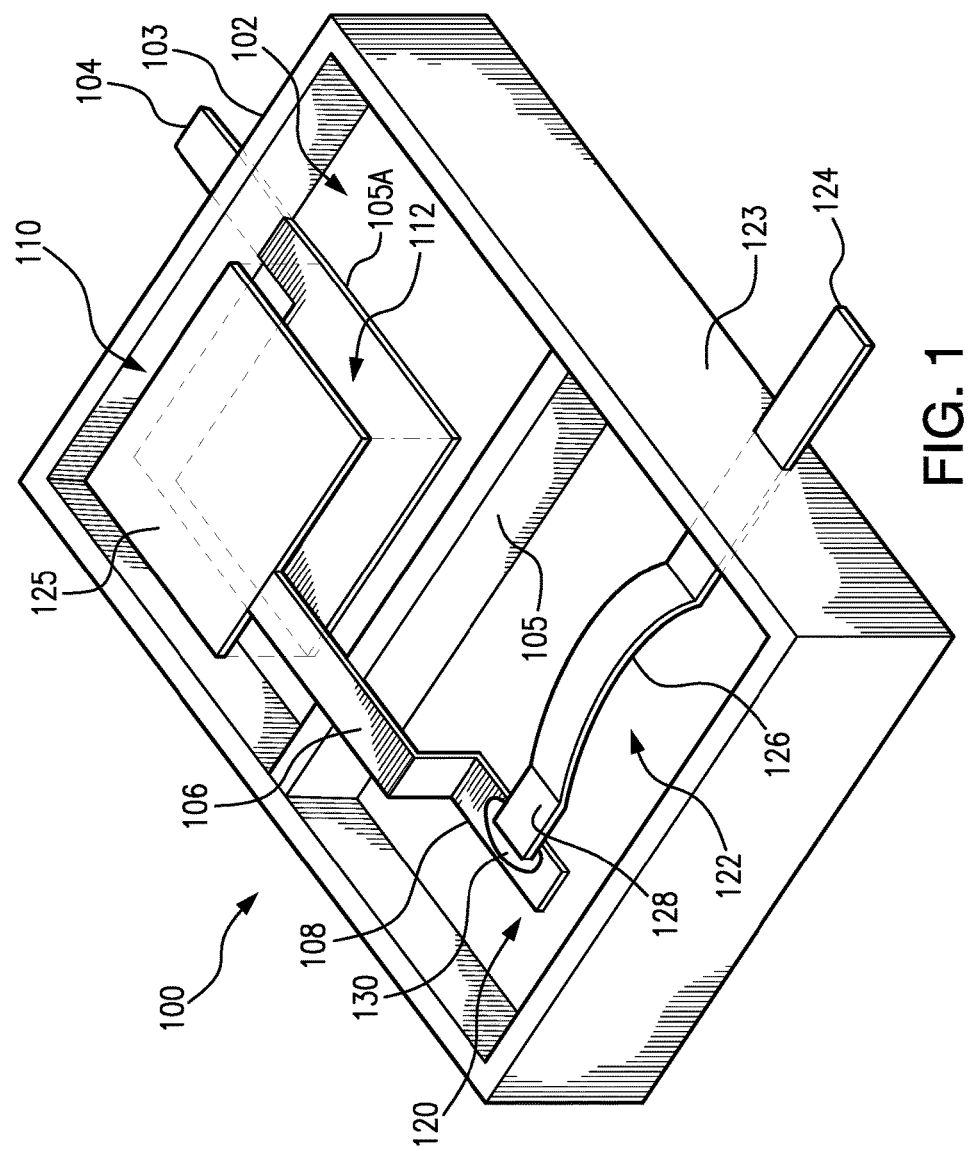
FIG. 1 shows a front perspective view from the top right side, of the interior of the surge protection device.
Figure 2:
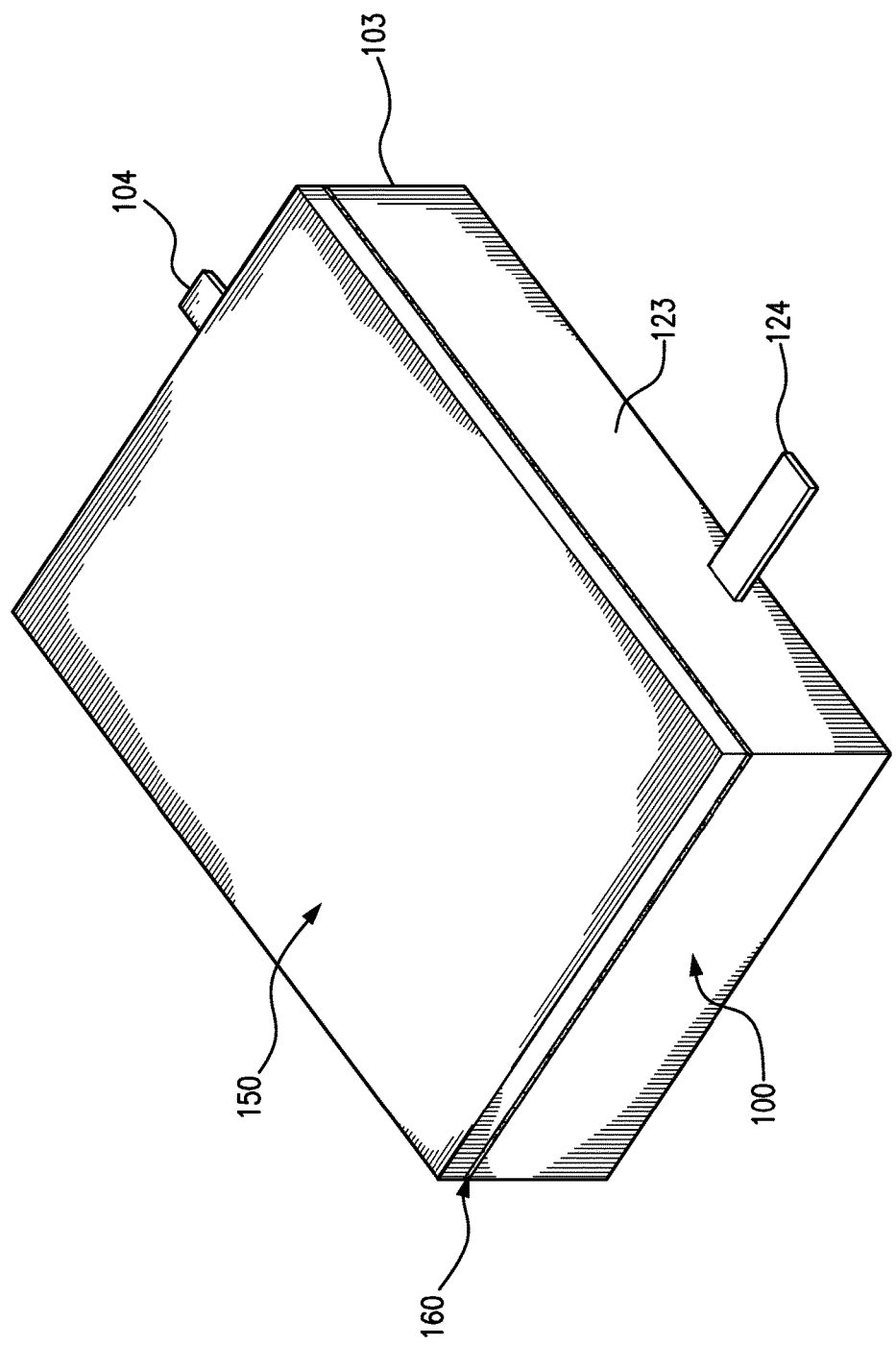
FIG. 2 shows a front perspective view from the top right side, of the exterior of the surge protection device of FIG. 1.

FIG. 1 shows a front perspective view from the top right side, of the interior of the surge protection device. The surge protection device has a box-shaped ceramic housing 100 with an open side that is covered by a ceramic lid 150 shown in FIG. 2. The ceramic housing 100 and ceramic lid 150 form a gas-tight container that prevents the escape of explosive gases and scattered solids that may be produced by an uncoated metal oxide varistor (MOV) 110 contained in the housing 100. The ceramic housing 100 has two gas-tight chambers 102 and 122 separated by a ceramic partition 105, which are covered by the ceramic lid 150 that fastens onto the housing 100. A gasket 160 shown in FIG. 2, is positioned between the ceramic housing 100 and the ceramic lid 150, to seal the first and second gas-tight chambers 102 and 122. The ceramic housing 100 and ceramic lid 150 may be composed of an electrical grade porcelain to provide electrical insulation and mechanical containment of explosive gases and scattered solids.

The MOV device 110 is located in a first one of the gas-tight chambers 102, with a first conductive plate 105A connected to a first device lead 104 passing through the wall 103 of the housing. The MOV device 110 has a second plate 125 connected to an electrode 106 passing into the second gas-tight chamber 122, which terminates in a fixed contact 108. The MOV device 110 may comprise a metal oxide layer 112, for example a layer of zinc oxide grains, which is sandwiched between the two conductive plates 105 and 125. Notably, there is no coating on the MOV device 110, such as an organic polymer coating. Instead, the surge protection device relies upon the gas-tight container formed by the ceramic housing 100 and ceramic lid 150, to prevent the escape of explosive gases and scattered solids that may be produced by destruction of the MOV device's metal oxide core layer 112 during thermal runaway.

A thermal cutoff device 120 of simple construction, is located in the second gas-tight chamber 122 and is shielded by the ceramic partition 105 from combustion products or debris that may be scattered by the MOV device 110. The thermal cutoff device is connected to a second device lead 124 passing through the wall 123 of the housing.

The thermal cutoff device 120 comprises a spring connector 126 terminated with a moveable contact 128. The spring connector 126 has a spring bias that biases the moveable contact away from the fixed contact 108. The spring bias is directed in an upward direction in the view of FIG. 1. During assembly of the surge protection device, the spring connector 126 is urged toward the fixed contact 108, so that the moveable contact 128 becomes superimposed over the fixed contact 108 of the electrode 106. A low melting-temperature solder bond 130 is located between the fixed contact 108 and moveable contact 128, to temporarily bond the moveable contact 128 to the fixed contact 108. The solder-bonded contacts 108 and 128 form a series connection of the MOV 110 to the thermal cutoff device 120, which completes an electrical path between the first device lead 104 and the second device lead 124.

The solder bond 130 is configured to melt and release the moveable contact 128 from being bonded to the fixed contact 108 when the temperature of the contacts 108 and 128 rises above a melting point of the solder bond 130 due to a thermal runaway in the MOV 110. As a result, the bias of the spring connector 126 separates the contacts 108 and 128 and interrupts the connection of the thermal cutoff device 120 to the MOV 110, and thus interrupts the series path between the first and second device leads 104 and 124.

In an example embodiment, the fixed contact 108 and electrode 106 connected to the second conductive plate 125 of the uncoated MOV 110, may be composed of a metal, such as copper, having a high thermal conductivity, to conduct heat into the fixed contact 108 during a thermal runaway of the uncoated MOV 110. The moveable contact 128 and spring connector 126 of the thermal cutoff device 120, may be composed of a metal, such as bronze UNS C51000 or bronze UNS C53400, having a lower thermal conductivity than that of the fixed contact 108 and electrode 106. During a thermal runaway, the heat produced by the MOV 110 flows through the electrode 106 into the fixed contact 108 and the solder bond 130, elevating the temperature of the solder bond 130. Since the spring electrode 126 is connected to the second lead 124 that is at approximately ambient temperature, the heat accumulating in the solder bond 130 at its elevated temperature, will tend to flow into the moveable contact 128 and spring electrode 126. However, by using a lower thermal conductivity material in the moveable contact 128 and the spring electrode 126, than is used in the fixed contact 108 and electrode 106, less heat will be conducted away from the solder bond 130 into the spring electrode 126, thereby accelerating the rise in temperature of the solder bond during a thermal runaway.

In an example embodiment, the moveable contact 128 and/or the spring connector 126 of the thermal cutoff device 120, may have a reduced cross sectional area with respect to a cross sectional area of the electrode 106. By using a reduced cross sectional area in the moveable contact 128 and/or the spring electrode 126, than is used in the electrode 106, less heat will be conducted away from the solder bond 130 into the spring electrode 126 than is accumulating in the solder bond, thereby accelerating the rise in temperature of the solder bond during a thermal runaway.

Figure 3:
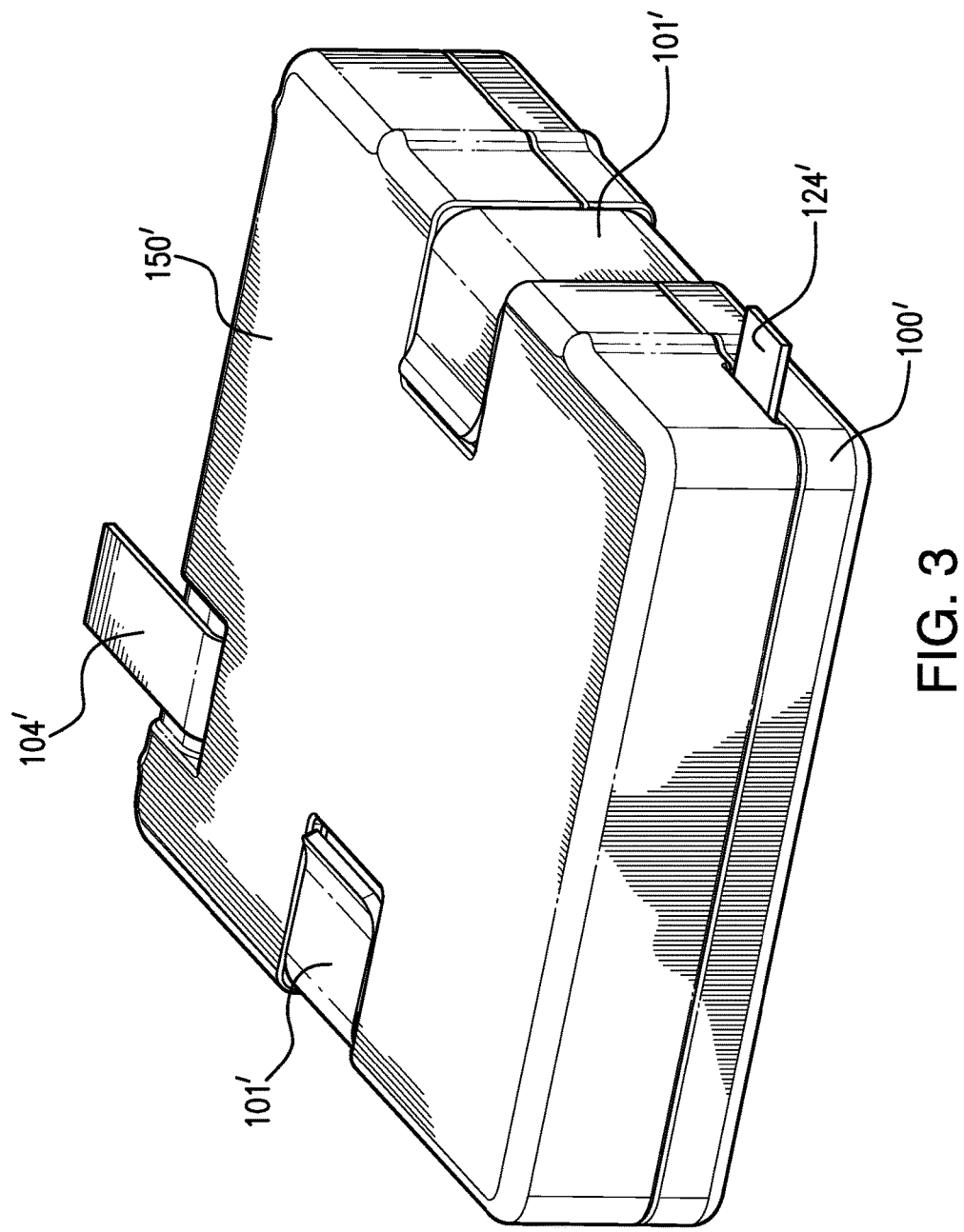
FIG. 3 shows a front perspective view from the top right side, of the exterior of a second embodiment of the surge protection device.

FIG. 3 shows a front perspective view from the top right side, of the exterior of a second embodiment of the surge protection device. The reference numbers correspond to similar components as in the first embodiment of FIG. 2, except that they are shown with a prime in FIG. 3. The ceramic lid 150' is shown fastened onto the housing 100' with the retainers 101'.

Figure 4:
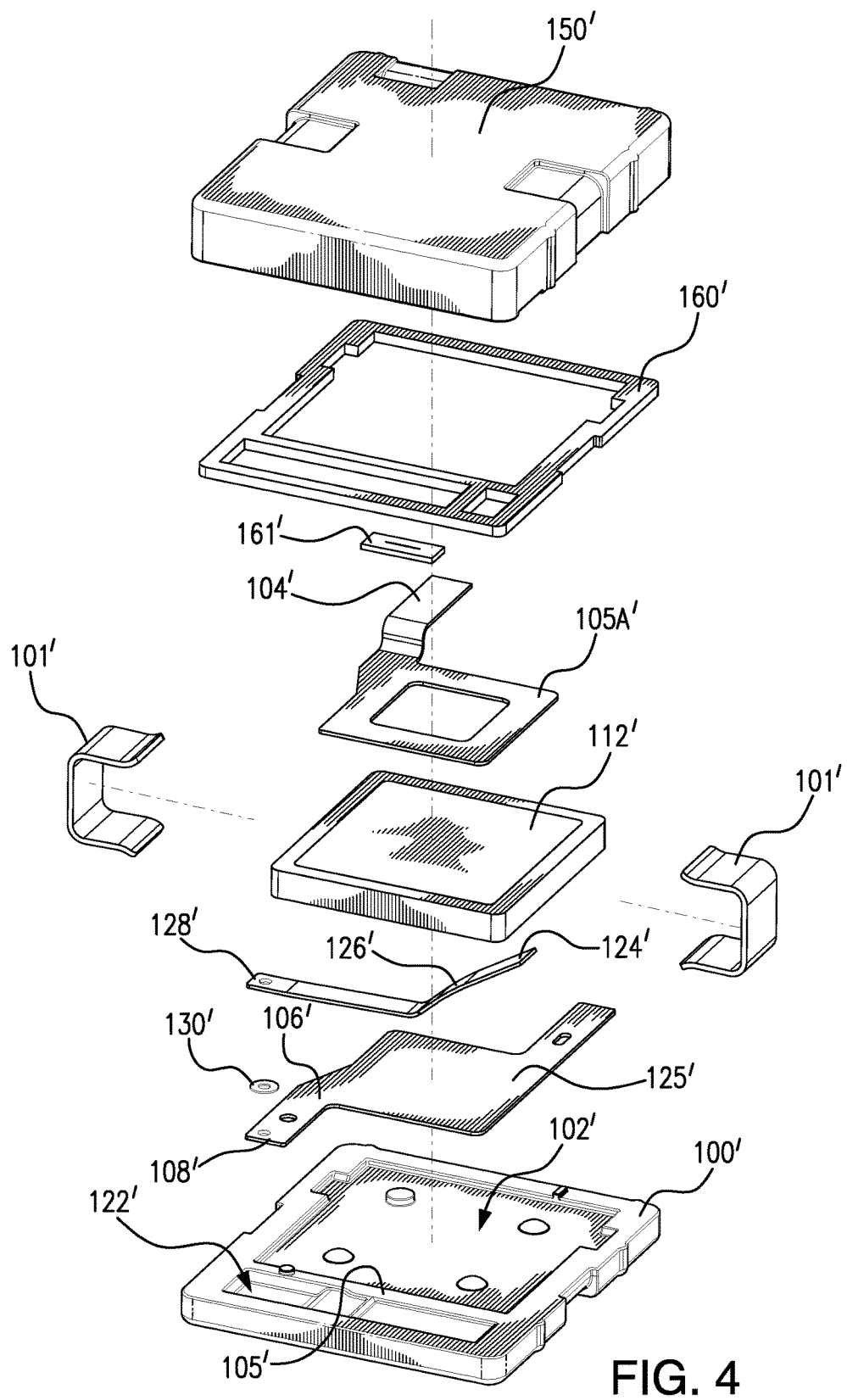
FIG. 4 shows an exploded, front perspective view from the top right side, of the second embodiment of the surge protection device of FIG. 3.

FIG. 4 shows an exploded, front perspective view from the top right side, of the second embodiment of the surge protection device of FIG. 3. The reference numbers correspond to similar components as in the first embodiment of FIG. 1, except that they are shown with a prime in FIG. 4. The box-shaped ceramic housing 100' in the alternate embodiment of FIG. 4, is not as deep as the box-shaped ceramic housing 100 in the first embodiment of FIG. 1. The box-shaped ceramic housing 100' of FIG. 4, has an open side that is covered by the ceramic lid 150'. In the same manner as was described for the first embodiment of FIGS. 1 and 2, the ceramic housing 100' and ceramic lid 150' form a gas-tight container that prevents the escape of explosive gases and scattered solids that may be produced by an uncoated MOV metal oxide layer 112' contained in the housing 100'. The ceramic housing 100' has two gas-tight chambers 102' and 122' separated by a ceramic partition 105', which are covered by the ceramic lid 150' that fastens onto the housing 100' with the retainers 101'. A gasket 160', 161' is positioned between the ceramic housing 100' and the ceramic lid 150', to seal the first and second gas-tight chambers 102' and 122'. The ceramic housing 100' and ceramic lid 150' may be composed of an electrical grade porcelain to provide electrical insulation and mechanical containment of explosive gases and scattered solids.

FIG. 4 shows the first conductive plate 105A' in the alternate embodiment of FIG. 4, positioned above the uncoated MOV metal oxide layer 112', whereas the first conductive plate 105A in the first embodiment of FIG. 1, is positioned below the uncoated MOV metal oxide layer 112. The first conductive plate 105A in the alternate embodiment of FIG. 4, is connected to a first device lead 104' passing through the lid 150', as shown in FIG. 3. The uncoated MOV metal oxide layer 112' in FIG. 4, has a second plate 125' connected to an electrode 106' passing into the second gas-tight chamber 122', which terminates in a fixed contact 108'. The uncoated MOV metal oxide layer 112' is located between the two conductive plates 105A' and 125'. In the same manner as was described for the first embodiment of FIGS. 1 and 2, the surge protection device relies upon the gas-tight container formed by the ceramic housing 100' and ceramic lid 150', to prevent the escape of explosive gases and scattered solids that may be produced by destruction of the uncoated MOV metal oxide layer 112' during thermal runaway.

FIG. 4 shows a thermal cutoff device 120' comprising a spring connector 126' terminated with a moveable contact 128'. In the same manner as was described for the first embodiment of FIGS. 1 and 2, the spring connector 126' has a spring bias that biases the moveable contact away from the fixed contact 108'. The spring bias is directed in a rightward direction in the view of FIG. 4. During assembly of the surge protection device, the spring connector 126' is urged toward the fixed contact 108', so that the moveable contact 128' becomes superimposed over the fixed contact 108' of the electrode 106'. A low melting-temperature solder bond 130' between the fixed contact 108' and moveable contact 128', will temporarily bond the moveable contact 128' to the fixed contact 108'. The solder-bonded contacts 108' and 128' will form a series connection of the uncoated MOV metal oxide layer 112' to the thermal cutoff device, which completes an electrical path between the first device lead 104' and the second device lead 124'.

In the same manner as was described for the first embodiment of FIGS. 1 and 2, the solder bond 130' is configured to melt and release the moveable contact 128' from being bonded to the fixed contact 108' when the temperature of the contacts 108' and 128' rises above a melting point of the solder bond 130' due to a thermal runaway in the uncoated MOV metal oxide layer 112'. As a result, the bias of the spring connector 126' will separate the contacts 108' and 128' and interrupt the connection of the thermal cutoff device to the uncoated MOV metal oxide layer 112', and thus interrupt the series path between the first and second device leads 104' and 124'.

The components of the surge protection device are simple, inexpensive, and easy to assemble. If the energy in a transient pulse is too high, localized heating in the uncoated MOV device during a thermal runaway, may melt, burn, vaporize, or otherwise damage or destroy the metal oxide core of the MOV device. However, the gas-tight container formed by the ceramic housing and ceramic lid surrounding the uncoated MOV device, is able to contain the explosive gases and scattered solids. The ceramic partition separating the uncoated MOV device in the first chamber from the thermal cut-off device in the second chamber, shields the thermal cutoff device from being fouled by debris scattered from destruction of the MOV device's metal oxide core during a thermal runaway.

Although specific example embodiments of the invention have been disclosed, persons of skill in the art will appreciate that changes may be made to the details described for the specific example embodiments, without departing from the spirit and the scope of the invention.

The invention claimed is:

1. A surge protection device, comprising:
   a ceramic housing having a first portion with a box-shape and an open side, the first portion comprising two gas-tight chambers separated by a ceramic partition, the housing including a second portion comprising a ceramic lid configured to fasten onto the first portion and cover the open side, forming a gas-tight container;
   an uncoated, metal oxide varistor located in a first one of the gas-tight chambers, the metal oxide varistor having a first conductive plate connected to a first electrical input lead that passes through a wall of the housing and a second conductive plate connected to an electrode that passes via the ceramic partition, into a second one of the gas-tight chambers, the electrode being terminated in a fixed contact in the second one of the gas-tight chambers;
   a thermal cutoff device located in the second one of the gas-tight chambers, the ceramic partition being configured to shield the thermal cutoff device from the metal oxide varistor, the thermal cutoff device comprising a spring connector connected to a second electrical input lead passing through a wall of the housing, the spring connector being terminated in a moveable contact, the spring connector having a spring bias that biases the moveable contact away from the fixed contact, the spring connector being configured to superimpose the moveable contact over the fixed contact of the electrode when the spring connector is urged toward the fixed contact; and
   a low melting-temperature solder bond between the fixed and moveable contacts, the solder bond being configured to melt and release the moveable contact from being bonded to the fixed contact when temperature of the fixed and moveable contacts rises above a melting point of the solder bond, the spring connector being configured with the spring bias to thereby separate the fixed and moveable contacts and interrupt electrical connection of the thermal cutoff device to the metal oxide varistor.

2. The surge protection device of claim 1, wherein the first and second one of the gas-tight chambers prevent release of explosive gases and scattered solids produced by the uncoated metal oxide varistor during a thermal runaway and the ceramic partition in the housing shields the thermal cutoff device from being fouled by the explosive gases and scattered solids.

3. The surge protection device of claim 1, further comprising:
a gasket positioned between the first and second portions of the ceramic housing, the gasket being configured to seal the first and second one of the gas-tight chambers, to thereby prevent release of explosive gases and scattered solids produced by the uncoated metal oxide varistor during a thermal runaway.

4. The surge protection device of claim 1, wherein the ceramic housing and ceramic lid are composed of an electrical grade porcelain.

5. The surge protection device of claim 1, wherein the electrode connected to the second conductive plate of the uncoated metal oxide varistor, is composed of a metal having a thermal conductivity to conduct heat to the solder bond during a thermal runaway of the uncoated metal oxide varistor.

6. The surge protection device of claim 5, wherein the spring connector of the thermal cutoff device, is composed of a metal having a lower thermal conductivity than that of the electrode connected to the second conductive plate, to enable heat flowing into the solder bond from the electrode, to be greater than heat flowing out of the solder bond into the spring connector.

7. The surge protection device of claim 1, wherein the electrode connected to the second conductive plate of the uncoated metal oxide varistor, is composed of copper and the spring connector of the thermal cutoff device is composed of one of bronze UNS C51000 or bronze UNS C53400.

8. The surge protection device of claim 1, wherein the spring connector of the thermal cutoff device, has a reduced cross sectional area with respect to a cross sectional area of the electrode connected to the second conductive plate, to enable heat flowing into the solder bond from the electrode, to be greater than heat flowing out of the solder bond into the spring connector.

* * * * *